March 13, 1962 R. B. WATSON ETAL 3,025,517
SIMULTANEOUS LOBE COMPARISON FOR RADAR DIRECTION FINDING
Filed Jan. 31, 1952 8 Sheets-Sheet 1
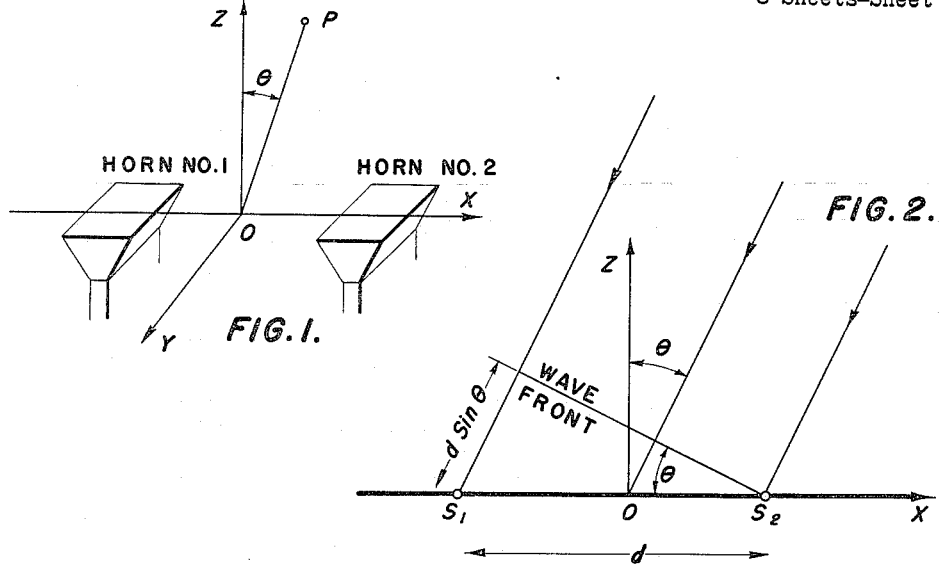
FIG. 1.
FIG. 2.
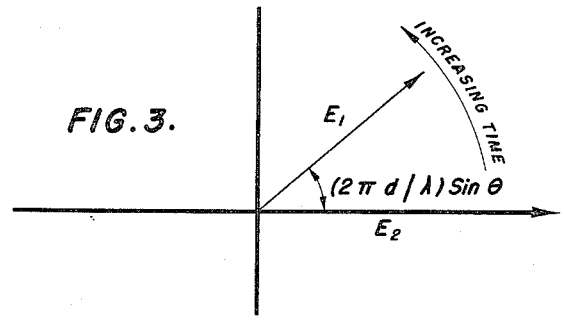
FIG. 3.
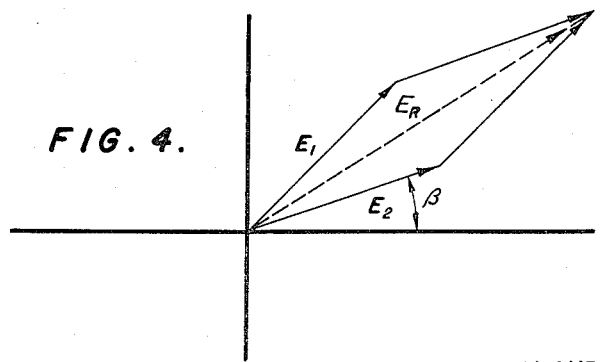
FIG. 4.
INVENTORS
CLAUDE W. HORTON
ROBERT B. WATSON
BY
Attorney

CLAUDE W. HORTON
ROBERT B. WATSON
INVENTORS

March 13, 1962  R. B. WATSON ETAL  3,025,517
SIMULTANEOUS LOBE COMPARISON FOR RADAR DIRECTION FINDING
Filed Jan. 31, 1952  8 Sheets-Sheet 3

CLAUDE W. HORTON
ROBERT B. WATSON
INVENTORS

BY C. D. O'Brien

Attorney

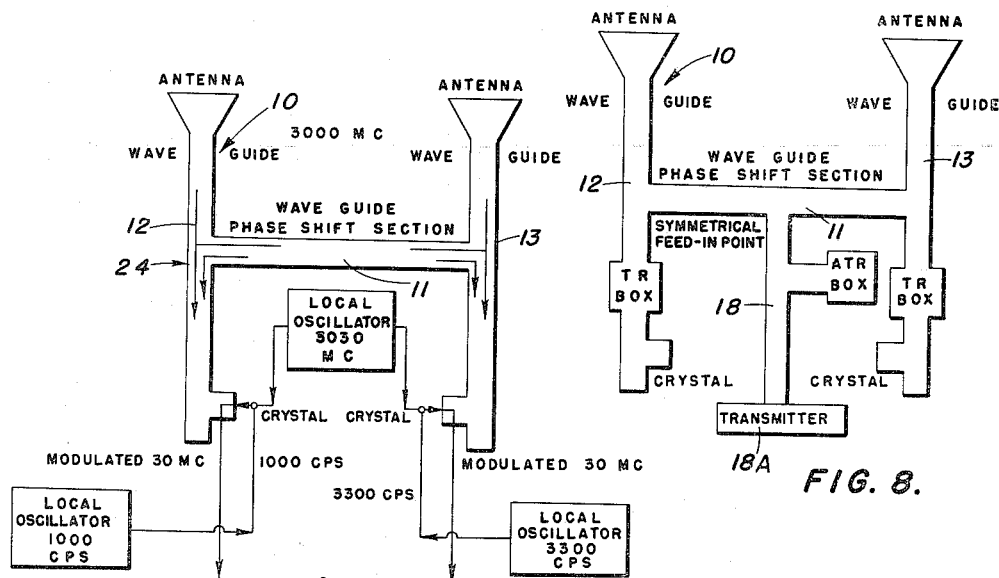
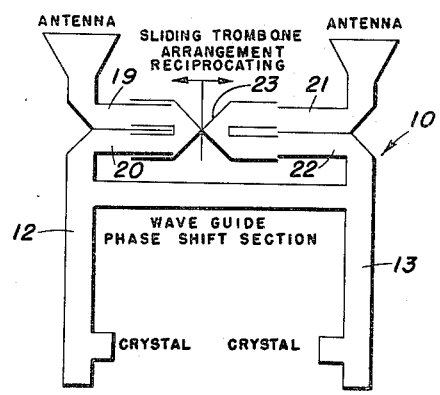
FIG. 8.
FIG. 9.
FIG. 10.
CLAUDE W. HORTON
ROBERT B. WATSON
INVENTORS

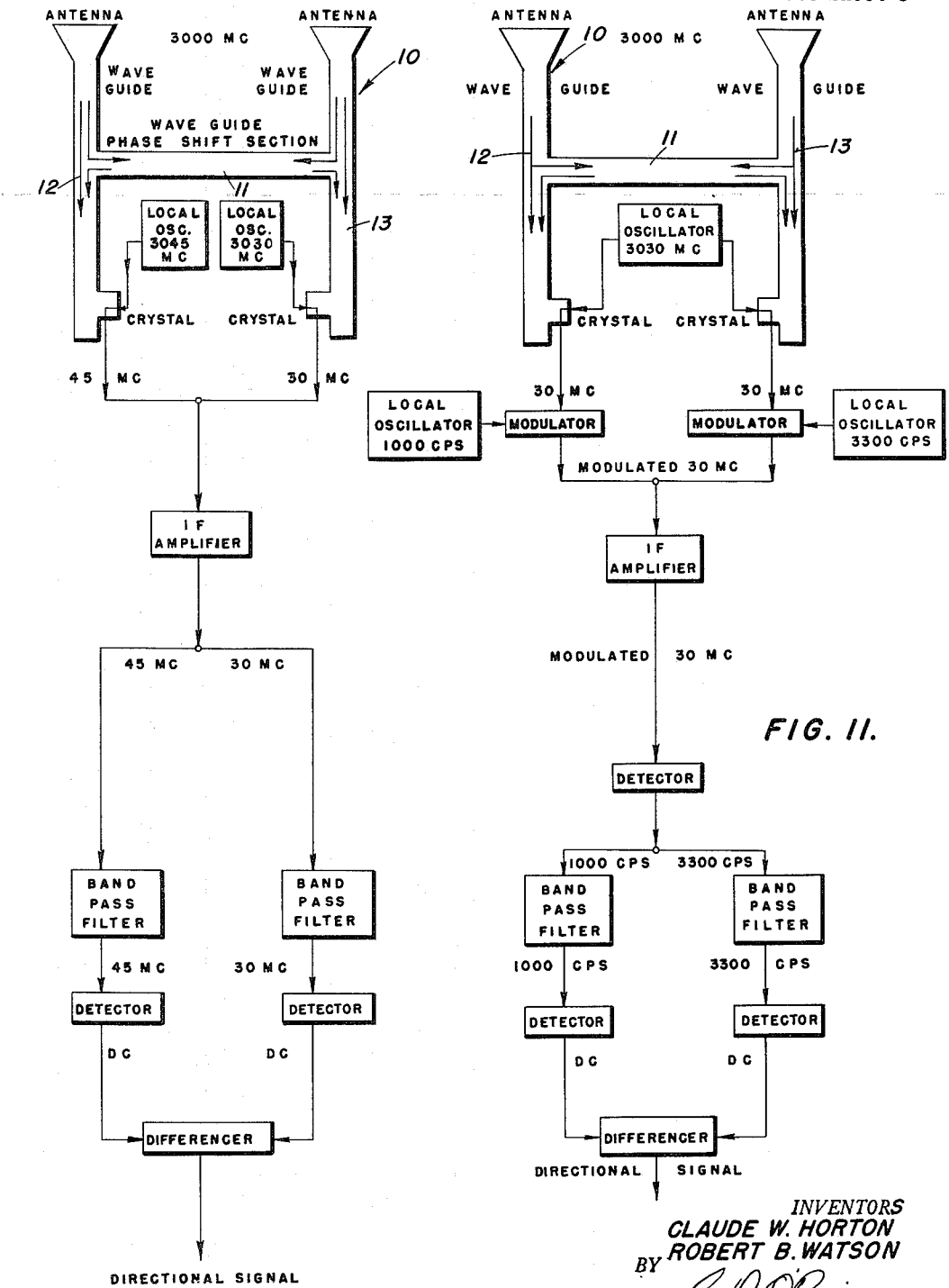

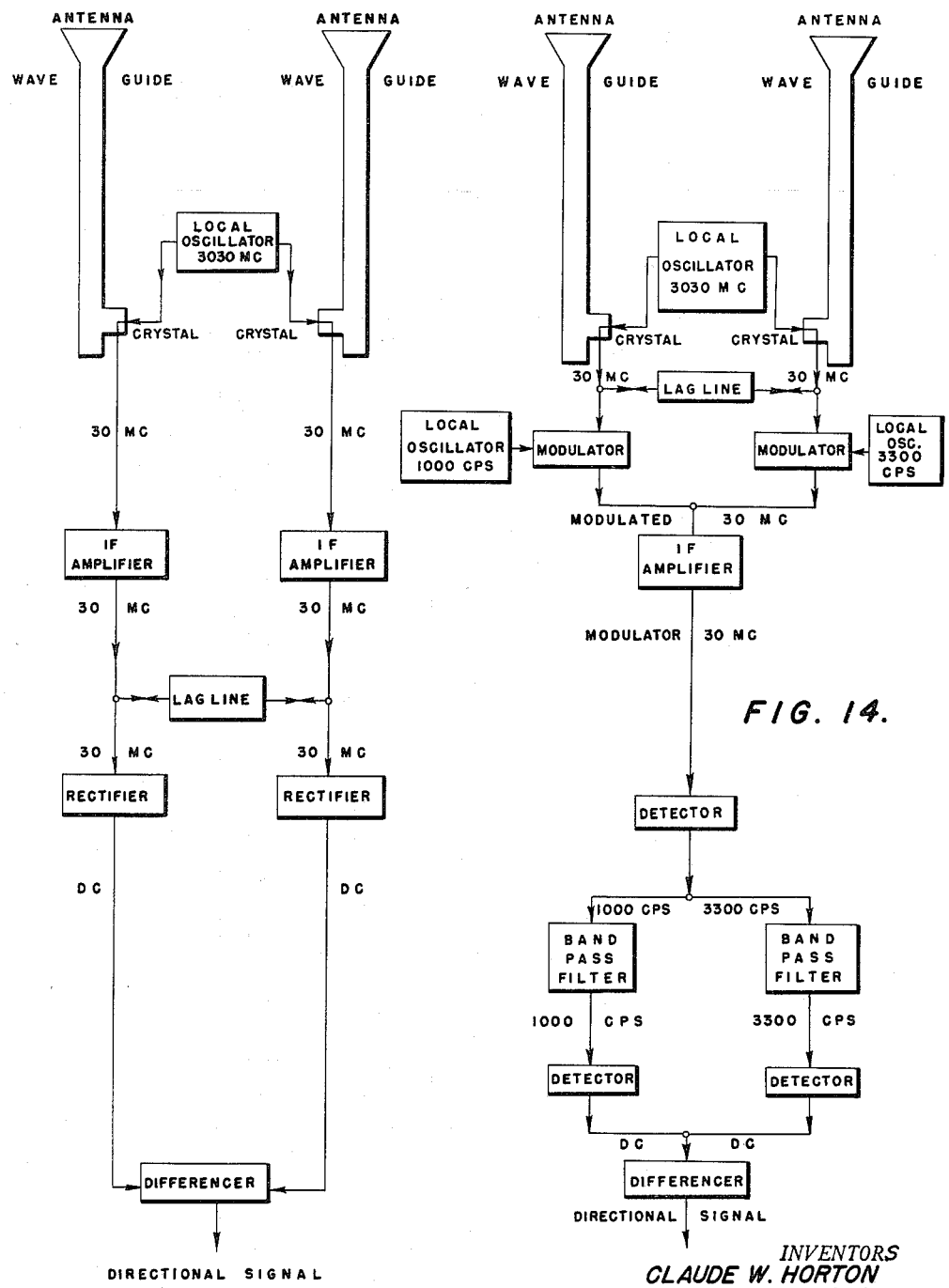

CLAUDE W. HORTON
ROBERT B. WATSON
INVENTORS

BY _____
Attorney

United States Patent Office 3,025,517
Patented Mar. 13, 1962

3,025,517
SIMULTANEOUS LOBE COMPARISON FOR
RADAR DIRECTION FINDING
Robert B. Watson and Claude W. Horton, Austin, Tex.,
assignors to the United States of America as represented by the Secretary of the Navy
Filed Jan. 31, 1952, Ser. No. 269,212
27 Claims. (Cl. 343—16)

This invention relates, in general, to radar apparatus, and more particularly to simultaneous antenna radiation lobe comparison and its applications to radar techniques.

The standard radar technique for measuring the bearing of a target may be described as the method of sequential lobing. In this method, a signal is transmitted and the echo received on a beam pointed to one side of the target. The intensity or amplitude of the echo is then compared with the equivalent value of the echo received on a beam pointed to the other side of the target. The difference between these two measurements affords an indication of the deviation of the target from a line that is centered between the two beams. There are certain difficulties inherent in this method which result from the fact that echo strengths of successive echoes are being compared.

Generally speaking, however, in the method of simultaneous lobe comparison, two antennas are connected together so that the output from one is delayed slightly in phase with respect to that of the other. The resultant signal has a directional pattern when the two antennas are rotated, which pattern is shifted from the axis of symmetry of the two antennas. If the phase shift is now associated with the other of the two antennas, a similar pattern is obtained except that it is shifted in the opposite direction to the first pattern mentioned. The difference between these two patterns produces an indication which is positive on one side of the axis of symmetry and negative on the other side, or the indications may be interpreted as meaning right and left as compared to the angular origin.

It is therefore an object of this invention to provide apparatus for receiving and comparing radar signals by the simultaneous lobe comparison method.

It is another object of the present invention to provide an antenna and waveguide system for use in simultaneous lobe comparison of radar signals.

It is a further object of this invention to provide a novel method of direction and range finding making use of radiant energy.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which:

FIG. 1 is a schematic view showing the geometrical relationship between the antennas and the signal;

FIG. 2 is a diagram of certain geometrical relationships;

FIG. 3 is a vector diagram of certain phase relationships;

FIG. 4 is a vector diagram showing certain other phase relationships;

FIG. 8 is a schematic view of waveguides and other apparatus arrangement, according to the invention;

FIG. 9 is a schematic view of another waveguide arrangement;

FIG. 10 is a block diagram of a first circuit according to the invention;

FIG. 11 is a block diagram of a second circuit in accordance with the present invention;

FIG. 12 is a block diagram of a third circuit in accordance with the invention;

FIG. 13 is a block diagram of a fourth circuit in accordance with the invention;

FIG. 14 is a block diagram of a fifth circuit in accordance with the invention;

Figure 5:
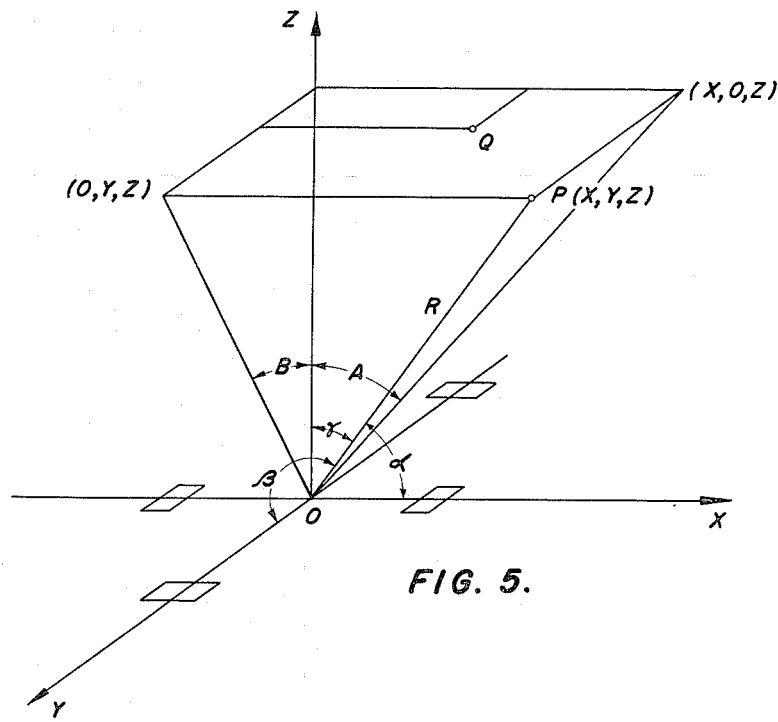
FIG. 5 is a schematic view showing certain geometrical relationships between antennae and signal.

In order to understand the operation of the apparatus and method of the present invention, it is well, first of all, to review the theoretical aspects of simultaneous lobe comparison.

Briefly, the method of the present invention, which is generally referred to as simultaneous lobe comparison, involves the measurement of the phase difference between the outputs resulting from two different radar beams or lobes in response to a single echo from a target. This echo is received simultaneously on the two radar beams.

The basic aspects of simultaneous lobe comparison are best illustrated by means of the two horn receivers 1 and 2 shown in FIG. 1. Here it will be noted that the faces of the two horns 1 and 2 lie in the X, Y plane, the Z-axis is normal to the horn faces, and the origin is situated midway between the two horns. The target which gives rise to the echo is located at the point P which is so far away that the reflected signal may be considered as a plane wave when it arrives at the horn.

It is well known that the response of an array of identical horns is the same as the response of one horn multiplied by that of an array of point receivers which are located at the centers of the various horns considered. Thus, in determining the response or pattern of the two horns shown in FIG. 1, it is only necessary to consider the pattern of two point receivers located at the centers of these two horns.

In FIG. 2, the receivers $S_1$ and $S_2$ represent point receivers. In the two-dimensional case in which the target P lies in the X, Z plane, the signal received at $S_1$ has traveled a distance $d \sin \theta$ more than the signal received at $S_2$, where $d$ is the distance between point receivers $S_1$ and $S_2$. This corresponds to an angular phase of $(2\pi d/\lambda) \sin \theta$, where $\lambda$ is, of course, the wave length of the signal. Obviously, if it were possible to measure the phase difference of the outputs of $S_1$ and $S_2$, there could be obtained direct measurement of the angle between the Z-axis and the target. Since the expression for the angular phase difference $(2\pi d/\lambda) \sin \theta$ will occur repeatedly, it is convenient hereafter to designate it by $\alpha$.

The practical methods of shifting the major lobe of a radiation pattern will now be considered. Suppose that an echo which returns from a distant target, such as P, impinges on the two horns of FIG. 1. The outputs of horns 1 and 2 are $R(\theta)E_1$ and $R(\theta)E_2$, respectively, where $E_1$ and $E_2$ are the responses of the point receivers $S_1$ and $S_2$ located at the centers of the horns, and $R(\theta)$ denotes the magnitude of the pattern of one of the horns. If equal lengths of waveguide are connected to each horn and if the outputs of two associated crystal detectors are connected in parallel, the output voltage can be computed from the vector diagram of FIG. 3.

The pattern of the two horns under these circumstances is:

$$\tfrac{1}{2}(E_1+E_2)R(\theta)=R(\theta)\cos \alpha/2 \qquad (1)$$

If, however, the signal received by horn 2 is delayed by $\beta$ radians before it is added to the signal received by horn 1, the resulting pattern is given by:

$$\tfrac{1}{2}R(\theta)(E_1+E_2\angle\beta)=R(\theta)\cos \tfrac{1}{2}(\alpha-\beta) \qquad (2)$$

The vector voltages represented in this analysis are shown plotted in FIG. 4. If the phase delay $\beta$ had been inserted in the output of $S_1$ instead of $S_2$, the effect would be to change the sign of $\beta$ in the above equation and to shift the lobe to the left. Thus, by a suitable choice of the value and location of $\beta$, it is possible to shift the major lobe to the left or to the right of its normal direction by a specified amount.

Figure 6:
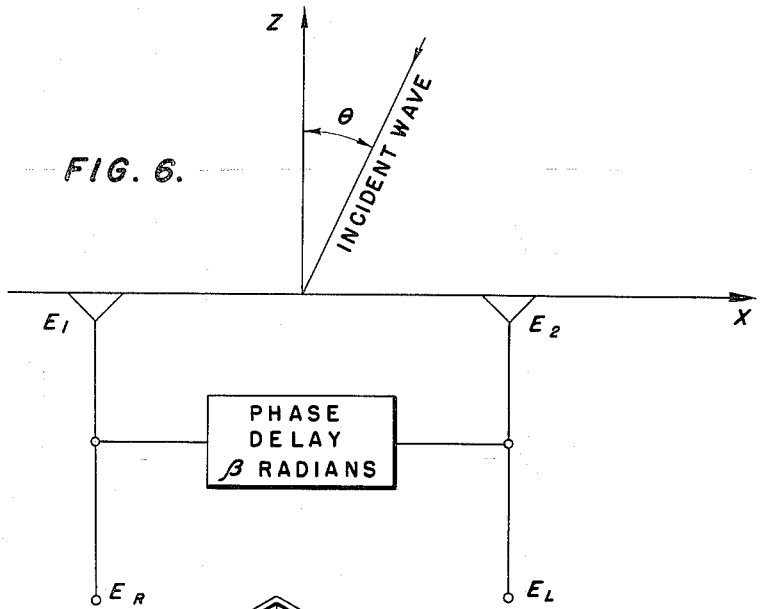
FIG. 6 is a diagram showing certain other geometrical relationships.

In considering methods of obtaining simultaneously two shifted lobe patterns, it is found that, in the case of the two horns shown in FIG. 1, shifted lobe patterns can be obtained simultaneously by means of a certain circuit, shown in FIG. 6. For instance, the outputs of the two horns are connected through a low pass filter with small attenuation and a phase delay of $\beta+2n\pi$ radians. The outputs $E_R$ and $E_L$, i.e., the output voltages $E_R$ and $E_L$ correspond to the right and left lobe patterns, are given by:

$$E_R=R(\theta)(E_1+E_2\angle\beta)/2=R(\theta)\cos \tfrac{1}{2}(\alpha-\beta) \qquad (3)$$
$$E_L=R(\theta)(E_2+E_1\angle\beta)/2=R(\theta)\cos \tfrac{1}{2}(\alpha+\beta) \qquad (4)$$

The voltages $E_1$ and $E_2$ are the output voltages of the point receivers $S_1$ nad $S_2$, respectively. The pattern associated with $E_R$ is shifted to the right, while the pattern associated with $E_L$ is shifted to the left an equal amount.

If the low pass filter is replaced by a high pass filter whose phase shift is $-\beta$ radians, the only effect is the reversal of the direction of the lobes. In writing the phase delay as $\beta+2n\pi$, the term $2n\pi$ is inserted for generality. If the phase difference $\beta$ is obtained, for example, by means of an additional piece of waveguide, the length of 1" x 1½" standard waveguide corresponding to the phase delay of $\pi/2$ is in the neighborhood of one centimeter. In some applications this length may be too small to be practical, and so it is necessary to add an additional length corresponding to the term $2n\pi$.

The voltages $E_R$ and $E_L$ are amplified equally and each is passed through a rectifier which, it is assumed, gives peak voltages. The output direct current voltages are $P_1$ and $P_2$, respectively, and are given by (see Equations 3 and 4):

$$P_1=R(\theta)|\cos \tfrac{1}{2}(\alpha-\beta)| \qquad (5)$$
$$P_2=R(\theta)|\cos \tfrac{1}{2}(\alpha+\beta)| \qquad (6)$$

The absolute values result from the action of the peak rectifiers. It is well to observe that $R(\theta)$ denotes the magnitude of the pattern of one of the horns, and, is, therefore, a real positive number.

It is not possible to give a simple expression for the difference voltage $P_1-P_2$ because of the absolute value signs. However, for a range of values of $$0\leq|\alpha|\leq 180°-\beta$$

both cosines are positive, and, therefore $$P_1-P_2=2R(\theta)\sin (\alpha/2)\sin \beta/2 \qquad (7)$$

For angles in the range $180°-\beta\leq|\alpha|\leq 180°+\beta$, one has $$P_1-P_2=\pm 2R(\theta)\cos\left(\frac{\alpha}{2}\right)\cos \frac{\beta}{2} \qquad (8)$$

Figure 16:
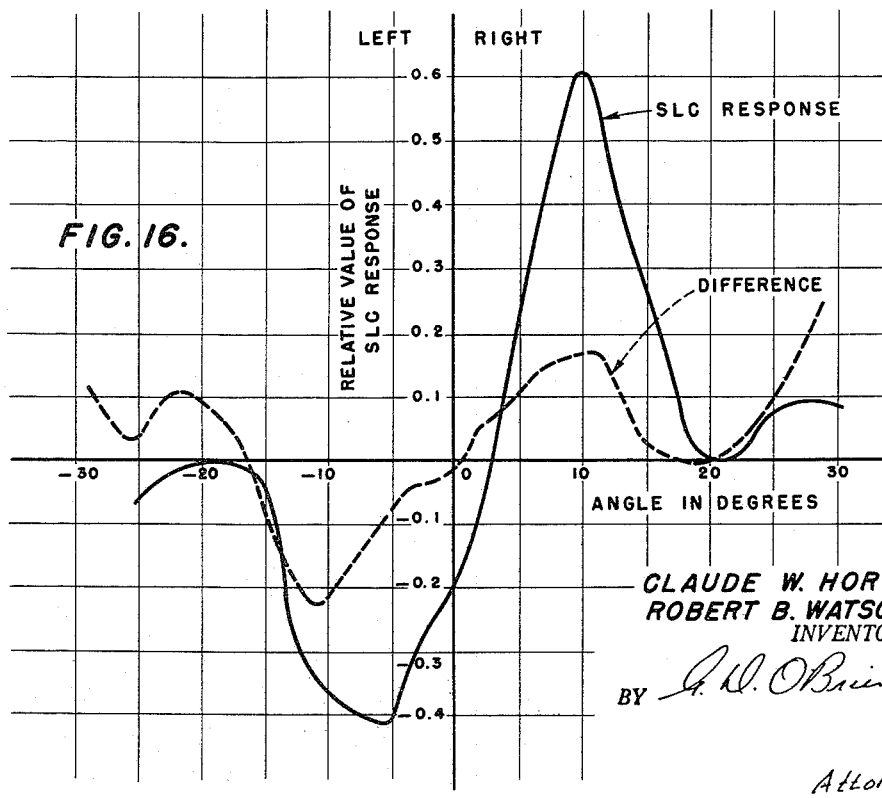
FIG. 16 is a graphical showing of certain other relationships in the present invention.

The plus or minus sign is used when $\theta$ is positive or negative, respectively. A graphical representation of the difference voltage $P_1-P_2$ versus the angle $\alpha$ is known as a simultaneous lobe comparison response curve. A graphical representation of this relationship is shown in FIG. 16. Some of these simultaneous lobe comparison response curves show very nice characteristics. It is to be observed that the output voltage is very nearly a linear function of the target angle over a wide range.

Another matter that should be considered is that of introducing the phase comparison in intermediate frequency channels as an alternative to introducing it at the horns as shown in FIG. 6. Let us suppose that the signals $E_1$ and $E_2$ are heterodyned to an intermediate frequency before the phase shifts, $\beta$, are introduced. In the following discussion the phases of the signals received at the points $S_1$ and $S_2$ are referred to the midpoint $O$. Then, the outputs of the two horns 1 and 2 may be expressed by:

$$E_1=R(\theta)\sin\left(\omega_s t-\frac{\alpha}{2}\right) \qquad (9)$$

$$E_2=R(\theta)\sin\left(\omega_s t+\frac{\alpha}{2}\right) \qquad (10)$$

Where $\omega_s$ is the angular frequency of the echo and $$\alpha=\left(\frac{2\pi d}{\lambda}\right)\sin \theta$$

Suppose that these signals are each heterodyned against the same local oscillator whose output is $E_0(\omega_0 t+\delta)$, where $(\omega_0-\omega_s)=\omega_i$, the intermediate angular frequency. The two heterodyne signals are $$h^{E_1}=R(\theta)E_0 \cos\left(\omega_i t+\delta+\frac{\alpha}{2}\right) \qquad (11)$$

$$h^{E_2}=R(\theta)E_0 \cos\left(\omega_i t+\delta-\frac{\alpha}{2}\right) \qquad (12)$$

Figure 17:
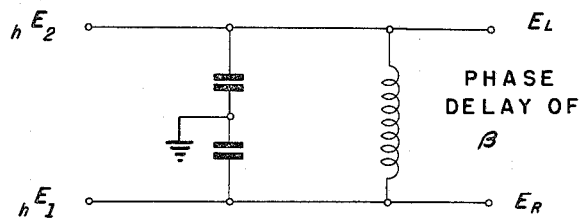
FIG. 17 is a schematic view of a circuit used in the present invention.

If $\omega_i$ is small enough so that it can be treated with lumped-constant networks, the heterodyne voltages can be applied to a circuit of the type shown in FIG. 17. The two output voltages $E_R$ and $E_L$ again correspond to shifted lobe patterns. Then, it can be seen that $$E_R=\tfrac{1}{2}R(\theta)E_0\left\{\cos\left(\omega_i t+\delta+\frac{\alpha}{2}\right)+\cos\left(\omega_i t+\delta-\frac{\alpha}{2}-\beta\right)\right\}$$
$$(13)$$

$$E_L=\tfrac{1}{2}R(\theta)E_0\left\{\cos\left(\omega_i t+\delta+\frac{\alpha}{2}-\beta\right)+\cos\left(\omega_i t+\delta-\frac{\alpha}{2}\right)\right\}$$
$$(14)$$

The factor ½ is introduced since it is assumed that the voltages are connected in parallel.

By using the relationship $$\cos 2A + \cos 2B = 2\cos (A+B)\cdot\cos (A-B)$$

the following equations are obtained:

$$E_R=R(\theta)E_0 \cos (\alpha+\beta)/2 \cos (\omega_i t+\delta-\beta/2)$$
$$(15)$$

$$E_L=R(\theta)E_0 \cos (\alpha-\beta)/2 \cos\left(\omega_i t+\delta-\frac{\beta}{2}\right) \qquad (16)$$

If these signals are passed through peak rectifiers and the difference of the outputs is formed, the result is:

$$P_1-P_2=|E_R|_{Peak}-|E_L|_{Peak}=$$
$$R(\theta)E_0\{|\cos (\alpha+\beta)/2|-|\cos (\alpha-\beta)/2|\} \qquad (17)$$

When this result is compared with Equations 5 and 6, it can be seen, then, that the introduction of a local oscillator reverses the sign of the error, i.e., it interchanges the direction of the lobes. A careful examination of the formulae shows that this result is a consequence of the assumption that the local oscillator has a higher frequency than the echo. If the local oscillator has a lower frequency, the difference voltage has the same sign as when the phase difference is introduced at the horns, i.e., as given in Equations 5 and 6.

Summarizing the aforegoing briefly, the basic aim of the invention is to compare the phases of the outputs of two horns for a common echo. In order to do this the two signals from the horns are combined in a phase-shift network and the two outputs are compared in amplitude. Thus, a measurement of phase difference is converted to a measurement of amplitude difference. It is seen intuitively that errors in amplitude prior to mixing will not be nearly as serious as errors in phase. On the other hand, after the signals are mixed there can be no error due to phase, whereas errors in amplitude become serious.

Suppose that the gain of one of the horns varies or that, in the case of the heterodyning circuit, the gain of one of the mixing tubes varies so that the signals which are mixed in the phase shifting network have unequal amplitudes. In this case it is necessary to apply the cosine law to the vectors shown in FIG. 3.

Suppose that the gain in horn 2 and the losses in the wave guide associated with horn 1 contribute to increase the relative gain in channel No. 2 by a factor of $g>1$. Then the output voltage $P_1-P_2$ corresponding to Equation 7 becomes:

$$\frac{P_1-P_2}{E_1}=[1+g^2+2g\cos(\alpha-\beta)]^{1/2}$$
$$-[1+g^2+2g\cos(\alpha+\beta)]^{1/2} \qquad (18)$$

The introduction of the gain factor does not affect the location of the zero values of $P_1-P_2$. This can easily be shown by setting $P_1-P_2=0$ For the particular case of $\beta=\pi/2$ the position of the maxima and minima of $P_1-P_2$ are independent of $g$. The effect of introducing the variation in gain changes the shape of the simultaneous lobe comparison response curve.

In general it can be said that any change which increases the gain of either horn or reduces the attenuation in either circuit prior to the phase shifting produces an overall improvement in the peak simultaneous lobe comparison response.

A second source of amplitude variations is in the phase shifting network. If the signals have equal gain before they are mixed, a loss factor $\alpha<1$ in the phase shifting network produces a response curve which is given by Equation 18 if $g$ is replaced by $a$. Thus, the general remarks made above are applicable in this case.

If, however, there is a variation in the gain prior to the mixing and also an attenuation in the phase shifting network, there will be, in general, a shift of the zero location. Suppose that one of the channels has a relative gain of $g>1$ more than the other, while the phase-shift network introduces a loss factor $\alpha<1$. Then the output voltage $(P_1-P_2)/E$ is zero when $$\sin\alpha=\pm(g^2+a^2-a^2g^2-1)/4ag \qquad (19)$$

The plus or minus sign occurs according to which channel has the greater gain. If the variations are small so that one may write $g=1+\epsilon$, $(1\gg\epsilon>0)$ and $\alpha=1-\eta$, $(1\gg\eta>0)$, then Equation 19 becomes:

$$\sin\alpha\sim\pm(\epsilon-\eta)/4 \qquad (20)$$

An inspection of Equation 19 shows that Equation 20 is not valid if either but not both $\epsilon$ and $\eta$ are zero. As a rule it is easy to insure that $a$ is near unity so that this is not a source of error.

In most applications it is necessary to amplify the signals that are being measured. It is easier to amplify the signal before rather than after the rectification. This means that the voltages $E_R$ and $E_L$ must be amplified separately. If they are not amplified an equal amount, an error in the direction of the target will result.

If one of the voltages $E_R$ or $E_L$ is amplified by a factor $k>1$ more than the other, there is no attenuation in the phase shifting network, and if $\beta=\pi/2$, then the equipment will give a zero indication (i.e., $P_1-P_2=0$) when $$\sin\alpha=\pm\frac{(1-k^2)}{(1+k^2)}\cdot\frac{(1-g^2)}{2g} \qquad (21)$$

The plus or minus sign is used accordingly as it is $E_R$ or $E_L$ that enjoys the greater gain. This expression is valid for $g$ and $k$ greater or less than unity.

If the signals $E_1$ and $E_2$ have unequal phase shifts prior to the phase mixing, an error in the direction of zero indication will result. It can be seen that if one channel has a phase delay greater than the other of the amount $\delta$, this corresponds to an error, $\Delta\theta$, in the direction of the zero indication of amount:

$$\Delta\theta=\pm\sin^{-1}\frac{\lambda\delta}{2\pi d} \qquad (22)$$

The plus or minus sign corresponds to errors in the different channels. Thus, the larger the separation $d/\lambda$, the less is the importance of this source of trouble. The errors $\delta$ can be introduced by unequal lengths of wave guide between the horn and the phase shifting network, or due to unequal phase shifts through the crystal if the signals are heterodyned before mixing.

It is instructive to consider the magnitude of the errors, $\Delta\theta$, in target direction due to unequal lengths of wave guide connecting the horn with the phase delay network. In a standard ½″ x 1″ X-band wave guide a wave length of 3.2 cm. in air corresponds to a wave length of 4.48 cm. in the guide. An error in length of amount $\delta$ cm. corresponds to an error, $\delta$, in the phase of $2\pi\epsilon/4.48$ radians. Thus, if $d=\lambda$, an error of 1.2 mm. in wave guide length corresponds to an error of ½ degree in the target direction. More generally $$\Delta\theta=\pm\sin^{-1}(\lambda\epsilon/4.48\ d) \qquad (23)$$

If the signal received by horn 2, FIG. 1, is given a phase delay $\beta$ before it is combined with the output of horn 1, the resultant voltage represents a pattern whose major lobe is shifted to the right by an amount given by $$\theta_{\max}\sim\sin^{-1}(\beta\lambda/2\pi d) \qquad (24)$$

This Equation 24 is obtained by assuming that the variation of $R(\theta)$ in the neighborhood of $\theta_{\max}$ is small. If the variation of $R(\theta)$ is not small then in the usual case when $R(\theta)$ has a negative derivative at $\theta_{\max}$, the true location of $\theta_{\max}$ is less than that indicated by Equation 24.

Similarly, if a phase delay $\beta'$ is introduced in the output of horn 1, a major lobe shifted to the left will be obtained. When $\beta$ and $\beta'$ are the same, as has been assumed above, the two lobes are mirror images so that for echoes from targets that are straight ahead the outputs $E_L$ and $E_R$ are equal and the indication voltage $P_1-P_2$ is zero. On the other hand if $\beta\neq\beta'$, the lobes are not mirror images and there will be an unbalance on echoes from targets that are straight ahead. Since this source of error appears to be easily avoided, a quantitative discussion is not given.

One other matter that should be considered is that of response in three dimensions, since in the problem of guided missiles the target will not be confined to the X, Z plane. Therefore, it is necessary to reconsider the formulae that have been developed above.

Referring to FIG. 5, suppose that the target is at a point P(X,Y,Z), whose distance from the origin is R. Let $\alpha(l=\cos\alpha)$, $\beta(m=\cos\beta)$, and $\gamma(n=\cos\gamma)$, be the angles between OP and the coordinate axes X, Y, Z, as shown in the drawing. For an echo returning from P, the phase difference between the signals received at horn 1 and horn 2 is $2\pi(d/\lambda)\cos\alpha$, whereas the pattern magnitude $R(\theta)$ becomes $R(\gamma)$.

Figure 18:
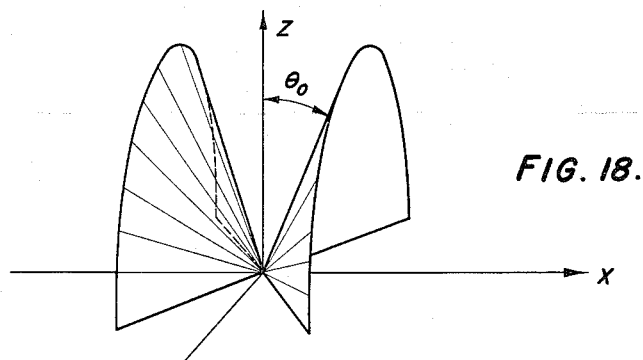
FIG. 18 is a three-dimensional view of certain conical surfaces that define the space outside of which the target corrections are correct.

In the simultaneous lobe comparison patterns in two dimensions, the indication of the target direction is correct between two angles, say $-\theta_0$ and $+\theta_0$, but for an angular zone beyond these values the indication is false. In the case of three dimensions, these angles define cones, and the region of true indication is the space outside the two cones, such as illustrated in FIG. 18. The region of negative Z is, of course, of little practical interest. Consequently, the cones are not shown in this region.

If the two horns 1 and 2 have identical patterns, the angles $-\theta_0$ and $+\theta_0$ depend only on the distance between the centers of the horns and not on the patterns of the individual horns. It might be mentioned that outside of the angular zone $-\theta_0$ and $+\theta_0$, there are alternating zones of true and false indications. In a well arranged system, these secondary indications will give peak responses that are sufficiently small to be neglected.

Figure 19:
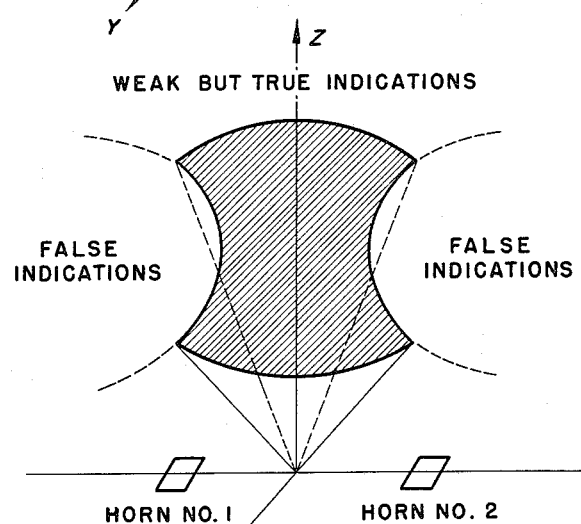
FIG. 19 is a three-dimensional schematic view showing an arrangement in space in which two horns will give correct error indications of usable magnitude.

It is necessary that the indication be of large enough amplitude to operate the equipment. Thus, target positions inside the main beam of the horn pattern and outside the cones illustrated in FIG. 18 and described above can be successfully measured. This space is indicated in FIG. 19. The choice of the main beam and of the horn separation should be made in such a way that the shaded area of FIG. 19 should be nearly square and sufficient to cover the angles of interest.

Of course, if the target is not confined to the X, Z plane, then a measurement with one pair of horns along the X-axis will not suffice to determine its direction. A second pair of horns is needed along the Y-axis.

It can be seen from FIG. 5 that the simultaneous lobe comparison measurement with the horns on the X-axis gives a measure of the direction cosine $l$, while the horns on the Y-axis furnish a measure of $m$. The third direction cosine, $n$, is determined from the relation $n=(1-l^2-m^2)^{1/2}$. The positive sign is chosen since only targets for which $Z>0$ are of interest.

In a typical case, there will be a pair of rudders in the X, Z plane as well as in the Y, Z plane. The direction cosines can be converted to steering signals as will now be described. The rudder in the Y, Z plane must turn the missile through an angle A given by (since $X=Rl$, $Y=R_m$, $Z=R_n$, where R is the distance from the origin O to the point P, see FIG. 5)

$$\tan A = \frac{X}{Z} = \frac{l}{n} \quad (25)$$

while the rudders in the X, Z plane must turn the missile through an angle B given by $$\tan B = \frac{Y}{Z} = \frac{m}{n} \quad (26)$$

For targets that are not too far from the Z-axis, $n$ is very nearly a constant, A and B are nearly equal to their tangent so that the component angles through which the missile must be turned are given by $$A = Cl \quad (27)$$
$$B = Cm \quad (28)$$

where C is a constant of proportionality.

Thus, if it is desired to mount the horns on a missile which is to be guided on a pursuit homing course, the problem of reducing the data is relatively simple.

If the angles involved are not large, it is not difficult to introduce a correction so that the missile will be guided in such a manner that the target will have the same bearing relative to the axis of the missile as the point Q, as shown in FIG. 5. Let A', B' be the angle components of the point Q corresponding to the values A and B for point P. It is possible to introduce phase shifts $\delta x$, $\delta y$, in the circuits of the X-axis horns and the Y-axis horns, respectively, corresponding to the angles A' and B'. If the missile is not roll stabilized, $\delta x$ and $\delta y$ will be sinusoidal phases whose frequencies are equal to the frequency of the missiles roll and whose amplitudes are equal but which are 90° out of phase.

Figure 7:
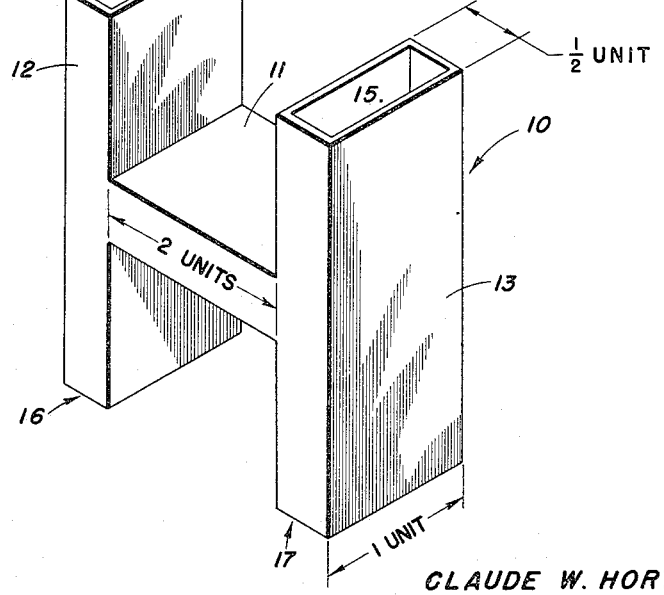
FIG. 7 is a perspective view of a waveguide structure forming part of the present invention.

Referring now to FIG. 7, there is shown a wave guide structure in accordance with the present invention. The wave guide, indicated generally by reference numeral 10, is shown as in the form of an H. The common leg 11 produces the difference in path length or phase between upright portions 12 and 13. This wave guide 10 produces a phase shift of about 90°.

The uprights 12 and 13 and the common leg 11 are of a unit length in width, i.e., the distance from the forward edge to the rear edge is one unit, while the dimension transverse to this width is approximately one-half a unit. Furthermore, the longitudinal dimension of the common leg 11 (the dimension from upright 12 to upright 13) is two units in length.

The two antennas, not shown, preferably of the polystyrene wedge type, are connected by suitable fittings to the open ends of the uprights at 14 and 15. Receivers are connected to the open ends 16 and 17 by other suitable fittings. A signal received at the two antennas proceeds, for example, directly from 14 to 16 and indirectly from 15 to 16 through the common leg 11; such that the additional length in the path from 15 to 16 produces the desired phase shift.

There may be some alteration of the latter signal due to reflections at the corners and re-radiation from the antenna at 14. There also may be some alteration in the signal proceeding from 14 to 16 because of energy travelling down the common leg 11. The output of 16, therefore, contains a signal made up of some energy from 14 directly, and some energy from 15, after undergoing a phase lag. Likewise, the output at 17 is made up of some energy directly from 15 and from 14 with a similar phase lag.

In FIG. 8, there is shown a modification of the wave guide structure illustrated in FIG. 7. The main difference between the two is in the provision of a means for symmetrically feeding power to the system when the comparison is made at high frequency. This means includes section 18 of the wave guide, which is shown connected to the central portion of the common leg 11, and which feeds power therein from a transmitter 18A.

In FIG. 9, there is shown still a further modification of the wave guide structure. A means is provided for adjusting or changing the phases of the two input signals prior to comparison. An open ended stub 19 is connected at a right angle to the upright 12 just below the antenna, and a similar stub 20 is also so connected just below the stub 19, the upright 12 being modified to provide the proper transition structure into these stubs. The upright 13 is provided with similar stubs 21 and 22. A unitary cap member 23 is connected to slide over the open ends of the stubs, and to provide for suitably connecting the open end of stub 19 to the open end of stub 20 and the open end of stub 21 to the open end of stub 22. The cap fits slidably over the stubs, and, by selecting the proper position of the cap, the path which the signal must take in proceeding down the uprights may be lengthened in one case and shortened in the other. The sizes of the components must be selected in accordance with good micro-wave techniques so that the desired amplitude relationship between the signals is not upset.

A circuit indicated generally by reference numeral 24, which is within the philosophy of the invention, is shown in FIG. 10, in which the signal comparison takes place at the antennas and at the original signal frequency. This circuit makes use of a modulating scheme to avoid two separate intermediate frequencies and local oscillators. The signals from both antennas, say 3000 mc., are heterodyned by a signal of, say 3030 mc. In addition, one signal is modulated by an audio signal of, say, 3300 cps. and the other signal by an audio signal of, say, 1000 cps. The resulting modulated signals are combined and amplified together in the IF amplifier, then detected and separated into signals corresponding to their corresponding modulation frequency (1000 and 3300 cps.) by passing through band pass filters, detected by detectors, and then passed into a differencer which indicates the directional signal property desired. It is the function of the differencer to compare the amplitudes of the two signals after the phase comparison circuit, and, hence, to produce a directional signal.

A second circuit somewhat similar to that of FIG. 10 is shown in FIG. 11. These circuits differ in that the modulation takes place at a slightly different position in the circuit.

Another circuit within the concept of the invention is illustrated in FIG. 12 in which a separate intermediate frequency is used for each signal. Those intermediate frequencies are fed through a common amplifying system, then separated, detected, and introduced into a differencer which indicates the desired directional information.

A circuit in which the signals are compared after amplification is illustrated in FIG. 13. The upright wave guides to which the antennas are attached have no connecting common leg, and the phase lag is introduced by means of a lag line after intermediate frequency amplification. The lag line may be of the type illustrated in FIG. 17. The signals are rectified and introduced into a differencer or indicator as before to give the directtional signal required.

In addition to the above, FIG. 14 shows a circuit in which the comparison takes place immediately after heterodyning, i.e., the intelligence is transmitted by low frequencies instead of by radio frequencies. This arrangement makes it possible to use a single IF amplifier instead of two IF amplifiers, as shown in FIG. 13. For example, the signals are modulated at different audio frequencies, amplified in the same intermediate frequency amplifying system, then detected, separated, and fed into the differencer.

Figure 15:
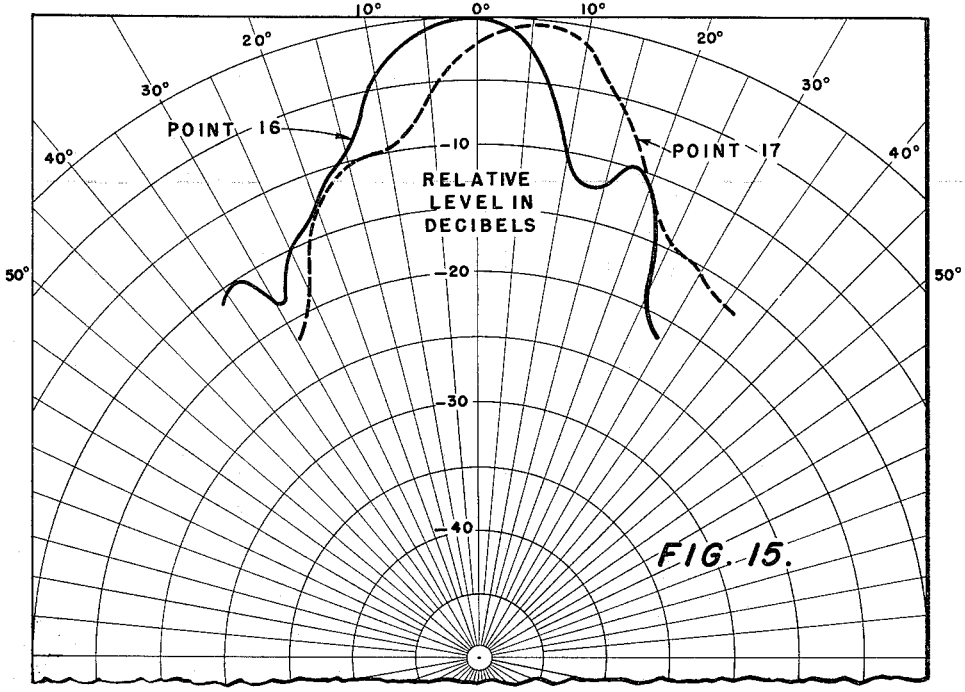
FIG. 15 is a graphical showing of certain relationships.

The directional patterns as measured at the points 16 and 17 of FIG. 7 are illustrated in FIG. 15. The intensities of the signals are plotted radially on polar coordinates, the angularity representing lines of sight at various angles to the Z-axis. In obtaining these curves, the two outputs from a wave guide of the type shown in FIG. 7 were connected to the inputs of two receivers. Incorporated in each of these receivers is an automatic gain control circuit which is so adjusted that the output of the receiver is approximately proportioned to the logarithm of the input. Each receiver output is connected to a vacuum tube voltmeter included in the receiver and the vacuum tube voltmeter output is applied to a recording milliammeter. The shifted lobe pattern is then obtained as the record of the milliammeter when the antennas are rotated, as a function of receiver output versus angle.

In order to obtain the difference pattern directly, it is desired to subtract the outputs of the two receivers from each other to obtain a curve of the type shown in FIG. 16. Of course, this method would give a proper difference pattern only if the two receivers are identical and if the outputs of the receivers are proportional in a linear manner to the inputs. Actually, as described above, the outputs are proportional to the logarithms of the inputs, and indeed only approximately so with a different scale calibration of output versus input for each receiver. Hence, difference patterns obtained by subtracting the outputs of two receivers can only be taken as a qualitative measure of the simultaneous lobe comparison response of the system.

An accurate difference pattern formed from a difference between two shifted lobe patterns may be obtained manually by taking into account the calibration of the two receivers, and this simultaneous lobe comparison response may be compared with the difference curve obtained on the recording meter. The actual means of obtaining the difference values was to modify the vacuum tube voltmeter in one of the receivers by a suitable connection to the other receiver so that the plot on the recording milliammeter was a measure of the difference between the outputs of the receivers.

The curves of FIGS. 15 and 16 were obtained using polystyrene horns separated by two wave lengths and, of course, connected to the wave guide structure of FIG. 7. Careful calibration data were taken for the receivers at the time the shifted lobe patterns were taken. The shifted lobe patterns were converted to linear measure by use of the calibrations and the differences taken between them. This is plotted as the simultaneous lobe comparison response in FIG. 16. Note the difference between the two curves in FIG. 16, which is most pronounced at fairly large angles. At these angles the two shifted lobe patterns give small values of amplitude and the difference is also small. However, the ratio between the values remains about the same as it does near 0°, and hence, the difference curve, which is expressed in logarithmic units, has about the same amplitude at the large angular readings as at 0°. The difference pattern shows proper behavior in the neighborhood of 0°; that is, the output is positive on the right side and negative on the left side in each case for some distance beyond 0°, and is, therefore, a measure of the direction of the source.

As can be seen in FIG. 16, the simultaneous lobe comparison response remains always positive on the right and always positive on the left up to 20° on either side of the origin. The difference also remains positive beyond that for the right side and negative on the left, although the magnitude is somewhat reduced.

In a general manner, while there has been, in the above rescription, disclosed what is deemed to be practical and efficient embodiments of the invention, it should be well understood that the invention is not limited to the exact structural arrangement and method disclosed, as there might be changes made in the structural arrangement, disposition and form of the parts and method without departing from the principles of the present invention as comprehended within the scope of the accompanying claims.

What is claimed is:

1. An apparatus for the simultaneous lobe comparison of a signal received from a remote point in space, comprising, at least two spaced horns having their faces situated in a common plane generally transverse to the direction of propagation of said signal, means for causing a delay in a portion of the signal received at each horn and for introducing the delays signal portion into the received signal on the other said horn, means for converting the resulting signals to intermediate frequencies, means for modulating each of said converted signals, means for amplifying said modulated signals, means for detecting said amplified signals, and means for comparing the amplitudes of said detected signals.

2. An apparatus for the simultaneous lobe comparison of a signal received from a remote point in space, comprising, at least two spaced horns having their faces situated in a common plane generally transverse to the direction of propagation of said signals, means for causing a delay in a portion of the signal received at each horn and for introducing the delayed signal portion into the received signal on the other horn, means for converting the resulting signals to intermediate frequencies, means for modulating each of said converted signals, means for amplifying said modulated signals, means for filtering said amplified signals, means for detecting said filtered signals, and means for comparing the amplitudes of the detected signals.

3. An apparatus for the simultaneous lobe comparison of a signal received from a remote point in space, comprising, two spaced horns the faces of which are situated in a common plane generally transverse to the direction of propagation of the signal, a waveguide arrangement for causing a delay in a portion of the signal received at each horn and for introducing the delayed signal portion into the received signal on the other horn, local oscillators converting the resulting signals to intermediate frequencies, the intermediate frequencies of the separate signals being different, an intermediate frequency amplifier into which the said signals are introduced for amplification, band pass filters for filtering said amplified signals, means for detecting said filtered signals, and a differencer for comparing the detected signals.

4. An apparatus for the simultaneous lobe comparison of a signal received from a remote point in space, comprising, two spaced horns the faces of which are situated in a common plane generally transverse to the direction of propagation of said signal, a waveguide arrangement for introducing a time lag in the path of a portion of the signal received at each horn and introducing said signal portion into the main signal received on the other horn, a first local oscillator connected to said waveguide arrangement to change each resulting signal to an intermediate frequency, second and third local oscillators connected to said waveguide arrangement to modulate the converted intermediate resulting frequency signals at different audio frequencies, an intermediate frequency amplifier in which both resulting signals are amplified, a detector for the amplified signals, band pass filters for each amplified signal, means for detecting said signals, and a differencer for comparing the detected signals.

5. An apparatus for the simultaneous lobe comparison of a signal received from a remote point in space, comprising, two spaced horns the faces of which are situated in a common plane generally transverse to the direction of propagation of said signal, a waveguide arrangement for causing a time lag in a portion of the signal received at each horn and for introducing said portion into the main signal received on the other horn, local oscillators connected to said arrangement to produce with each of the signals an intermediate frequency signal, the intermediate frequencies thereof being different, means for amplifying the intermediate frequency signals, band pass filters for filtering the two intermediate frequencies, detectors for the filtered signals, and a differencer for comparing the detected signals.

6. An apparatus for the simultaneous lobe comparison of a signal received from a remote point in space, comprising, at least two spaced horns the faces of which are situated in a common plane generally transverse to the direction of propagation of said signal, a section of waveguide attached to each horn, a local oscillator connected to saide waveguides to produce an intermediate frequency signal with each of the signals carried therein, separate means for amplifying each of the intermediate frequencies, a lag line connected across the output circuits of the said separate means, means for rectifying each of the signals, and a differencer for comparing the rectified signals.

7. An apparatus for the simultaneous lobe comparison of a signal received from a remote point in space, comprising, two spaced horns the faces of which are situated in a common plane generally transverse to the direction of propagation of said signal, a waveguide section attached to each horn, a first oscillator connected across the free ends of said waveguide sections to produce intermediate frequency signals, a lag line also connected thereacross for introducing a phase delay in the signals from each horn, second and third oscillators connected to each of said waveguide sections to produce modulated signals with each of the signals received by the horns and transmitted by the waveguide sections, means for amplifying the intermediate frequency signals together, a detector for said amplified signals, a band pass filter for filtering each modulated signal, and a differencer for comparing the filtered signals.

8. An arrangement for the simultaneous lobe comparison of a signal received from a remote point in space, comprising, two spaced horns having their faces situated in a common plane generally transverse to the direction of propagation of said signal, means for causing a delay in a portion of the signal received at each horn and for introducing the delayed signal portion into the main signal received by the other horn, means for converting the resultant signals to intermediate frequencies, means for modulating each of said converted signals, means for amplifying each of the modulated signals, means for filtering the amplified signals, means for detecting the filtered signals, and means for comparing the amplitudes of the detected signals.

9. An arrangement for the simultaneous lobe comparison of a signal received from a remote point in space, comprising, two spaced horns having their faces situated in a common plane generally transverse to the direction of propagation of said signal, means for causing a delay in a portion of the signal received at each horn and for introducing the delayed signal portion into the main signal on the other horn, means for converting the resultant signals to intermediate frequencies, means for modulating each of said converted signals, means for amplifying each of said amplified signals, means for filtering the amplified signals, means for detecting the filtered signals, means for comparing the amplitudes of the detected signals, and means for introducing power into the system.

10. An apparatus for simultaneous lobe comparison of a signal received from a remote point in space, comprising, a first and second horn each having its face situated in a common plane generally transverse to the direction of propagation of said signal, means for causing a common phase shift in a portion of the signal received at each horn and for introducing each phase shifted signal portion into the main signal of the other horn, and means for introducing power into the system.

11. A method for determining the bearing of a point with respect to a given set of axes by simultaneous lobe comparison, comprising, the steps of simultaneously receiving a signal from said point at two spaced remote points, providing a direct path from each of said other spaced points and a common path between each of said direct paths to shift the phase of the received signals, combining each of the signals from said common path with the signals from the direct paths, and then comparing the amplitudes of the resulting combined signals to determine the phase difference therebetween and thus the bearing to said point with respect to said set of given axes.

12. A method for determining the bearing of a point with respect to a given set of axes by simultaneous lobe comparison, comprising, the steps of simultaneously receiving a signal from said point at two spaced remote points, providing a direct path from each of said spaced remote points and a common path between each of said direct paths to shift the phase of the received signals, combining one of the phase shifted signals with the other directly received signal of which it is not a part, combining the second of the phase shifted signals with the other directly received signal of which it is not a part, and then comparing the amplitudes of the resulting combined signals to determine the phase difference therebetween and thus the bearing to said point with respect to said given set of axes.

13. A method for determining the bearing of a point with respect to a given set of axes by simultaneous lobe comparison, comprising, the steps of simultaneously receiving a signal from said point at two spaced remote points, providing a direct path from each of said spaced remote points and a common path between each of said direct paths so that each signal in said common path will be shifted in phase with respect to the signal of which it is a part, combining each of the signals from said common path with the signals from the direct paths, and then comparing the amplitudes of the resulting combined signals to determine the phase difference therebetween and thus the bearing of said point with respect to said given set of axes.

14. A method for determining the bearing of a point with respect to a given set of axes by simultaneous lobe comparison, comprising, the steps of simultaneously receiving a common signal from said point at two spaced remote points, providing a common path so that a portion of each received signal is shifted in phase with respect to the signal of which it is a part, combining each of said phase shifted signal portions with the unshifted signal portions of which it is not a part, and then comparing the amplitudes of the resulting combined signals to determine the phase difference therebetween and thus the bearing to said point with respect to said given set of axes.

15. A method for determining the direction of an object with respect to a given set of axes by simultaneous lobe comparison, comprising, the steps of simultaneously receiving a common signal from said object at two spaced antennas, providing a common path to shift a portion of the signal received at one antenna relatively in phase with respect to the signal received at the other said antenna, combining the first phase shifted signal portion of the first received signal with the second received signal, utilizing said common path to shift a portion of the second of the received signals relatively in phase with the first of said received signals, combining the second phase shifted signal portion of said second received signal with the first of said received signals, and then comparing the amplitudes of the resulting combined signals to determine the phase difference therebetween and thus the bearing of said object with respect to said given set of axes.

16. A method for measuring the phase difference between the combined output signals resulting from two different beams or lobes developed by a single signal from a remotely located point, comprising, the steps of simultaneously receiving said signal from said point at at least two spaced remote points, providing a common path to shift a portion of each received signal so that it will be out of phase with the signal of which it is a part, introducing each of said phase shifted signal portions to the other unshifted signal of which it is not a part, and then comparing the amplitudes of the resulting combined signals, whereby the phase difference between the combined output signals can be determined.

17. A method for measuring the phase difference between the combined output signals resulting from two different beams or lobes developed by a single signal from a point, comprising, the steps of simultaneously receiving a common signal from said point at two spaced points remote from said point, causing a common phase shift of a portion of each received signal so that it will be out of phase with the received signal of which it is a part, introducing each of said phase shifted signal portions to the other remaining unshifted signal portion, and then comparing the amplitudes of the resulting combined signals, whereby the phase difference between the combined output signals can be determined.

18. A method for measuring the phase difference between the combined output signals resulting from two different beams or lobes developed by a single signal from an object, said object being separated from spaced receiving points by a sufficient distance such that the signal from said object is represented by a plane wave when it arrives at said spaced receiving points, comprising, the steps of simultaneously receiving the single signal from said object at said two spaced receiving points, providing a common path so that each received signal will be shifted in phase with respect to the received signal of which it is a part, introducing each phase shifted signal to the other received signal, and then comparing the amplitudes of the resulting signals, whereby the phase difference between the compared output signals can be determined.

19. A method for obtaining the bearing of a source of signals by the simultaneous lobe comparison of said signals, comprising, simultaneously receiving signals from said source at two spaced points remote from said source, providing a common path to shift the phase of each received signal with respect to the received signal of which it is a part, combining the first phase shifted signal with the second received signal wherein a first combined signal resulting from said first phase shifted signal and said second received signal is obtained which has a maximum value when said source of signals is located along a line at an angle to the axis of symmetry of said spaced points, combining said second phase shifted signal with said first received signal wherein a second combined signal, resulting from said second phase shifted signal and said first received signal, is also obtained and has a maximum value when said source of signals is at an angle equal to but on the opposite side of said axis of symmetry of said spaced points, comparing the amplitudes of said combined resultant signals such that the phase difference between said combined resultant signals is zero when said source of signals is situated on said axis of symmetry of said spaced points, the phase difference output therebetween being positive when said source of signals is to the right of said axis and negative when said source of signals is to the left of said axis, whereby the bearing of said source of signals can be ascertained with respect to said axis.

20. A simultaneous lobe comparison method for receiving and comparing signals, comprising, the steps of simultaneously receiving a signal at two spaced points, providing a common path to cause a portion of each received signal to be shifted in phase with respect to the remaining portion of the signal of which it is a part, combining each of said phase shifted signal portions with the remaining portion of the other signal, and then comparing the amplitudes of the resulting combined signals to determine the phase difference therebetween.

21. A simultaneous lobe comparison method for receiving and comparing signals, comprising, the steps of simultaneously receiving a common signal at two spaced points, passing a portion of the received signal received at each point through a common phase shifting path, combining each of said phase shifted signal portions with the remaining portion of the other received signal, and then comparing the amplitudes of the resulting combined signals to determine the phase difference therebetween.

22. A method for determining the bearing of an object with respect to a given set of axes by simultaneous lobe comparison, comprising, the steps of propagating a signal to said object, simultaneously receiving the reflected signal from said object by a pair of spaced antennas, introducing the signal received by each of the antennas into a waveguide for each antenna, passing a portion of the signal in each waveguide through a common waveguide of a length approximately a multiple wavelength of the received signal to shift the phase thereof, introducing each phase shifted signal portion from said common waveguide into the waveguide of the other antenna, and then comparing the amplitudes of the resulting signals to determine the phase difference therebetween.

23. An apparatus for simultaneous lobe comparison of a signal received from a remote point in space, comprising, at least two spaced horns having their faces situated in a common plane generally transverse to the direction of propagation of said signal, a waveguide arrangement for causing a shift in phase of a portion of said signal received at each horn and for introducing the phase shifted signal portion into the received signal of the other horn, including two parallel sections and a transverse section joining the said parallel sections, the transverse section being of length greater than twice its longest cross-sectional dimension, each of said parallel sections having a width at least equal to one-half of said longest cross-sectional dimension of said transverse section of waveguide, whereby the signals from said parallel sections will be caused to travel through said transverse section of waveguide, means for converting the resulting signals to intermediate frequencies, means for modulating each of said converted signals, means for amplifying said modulated signals, means for detecting said amplified signals, and means for comparing the amplitudes of said detected signals.

24. An apparatus for simultaneous lobe comparison of a signal received from a remote point in space, comprising, at least two spaced horns having their faces situated in a common plane generally transverse to the direction of propagation of said signal, a waveguide arrangement for causing a shift in phase of a portion of the signal received at each horn and for introducing the phase shifted signal portion into the received signal of the other horn, including a first section of waveguide extending from said first horn perpendicular to said common plane, a second section of waveguide extending from said second horn perpendicular to said common plane, and a third section of waveguide extending between said first and second sections of waveguide at intermediate points in said first and second sections thereof, said third section of waveguide being of length greater than twice its longest cross-sectional dimension, each of said first and second waveguide sections having a width at least equal to one-half of said longest cross-sectional dimension of said third section of waveguide, whereby the signals from said first and second waveguide sections will be caused to travel through said third section of waveguide, means for converting the resulting signals to intermediate frequencies, means for modulating each of said converted signals, means for amplifying said modulated signals, means for detecting said amplified signals, and means for comparing the amplitudes of said detected signals.

25. An apparatus for simultaneous lobe comparison of a signal received from a remote point in space, comprising, a first horn and a second horn each having its face situated in a common plane generally transverse to the direction of propagation of said signal, a waveguide arrangement for causing a shift in phase of a portion of the signal received at each horn and for introducing the phase shifted signal portion into the received signal of the other horn, including a first section of waveguide extending from said first horn in a direction perpendicular to said common plane, a second section of waveguide extending from said second horn perpendicular to said common plane, a third section of waveguide extending between said first and second sections intermediate of the ends of said first and second sections of waveguide, said third section of waveguide being of length greater than twice its longest cross-sectional dimension, each of said first and second waveguide sections having a width at least equal to one-half of said longest cross-sectional dimension of said third section of waveguide, whereby the signals from said first and second sections of waveguide will be caused to travel through said third section of waveguide, a waveguide member entering the central portion of said third section of waveguide for the introduction of power into the system, means for converting the resulting signals to intermediate frequencies, means for modulating each of said converted signals, means for amplifying said modulated signals, means for detecting said amplified signals, and means for comparing the amplitudes of said detected signals.

26. An apparatus for simultaneous lobe comparison of a signal received from a remote point in space, comprising, a first horn and a second horn each having its face situated in a common plane generally transverse to the direction of propagation of said signal, a waveguide arrangement for causing a shift in phase of a portion of the signal received at each horn and for introducing the phase shifted signal portion into the received signal of the other horn, including a first section of waveguide extending from said first horn in a direction perpendicular to said common plane, a second section of waveguide extending from said second horn perpendicular to said common plane, a third section of waveguide extending between said first and second sections of waveguide intermediate of the ends thereof, said third section of waveguide being of length greater than twice its longest cross-sectional dimension, each of said first and second sections of waveguide having a width at least equal to one-half of said longest cross-sectional dimension of said third section of waveguide, whereby the signals from said first and second waveguide sections will be caused to travel through said third section of waveguide, an adjusting means cooperating with each of said first and second sections of waveguide, said adjusting means comprising a sliding cap member which when moved in one direction increases the effective length of one of said first and second sections of waveguide while when moved in an opposite direction decreases the effective length of the other of said first and second sections of waveguide, means for converting the resulting signals to intermediate frequencies, means for modulating each of said converted signals, means for amplifying said modulated signals, means for detecting said amplified signals, and means for comparing the amplitudes of said detected signals.

27. An apparatus for simultaneous lobe comparison of a signal received from a remote point in space, comprising, a first horn and a second horn each having its face situated in a common plane generally transverse to the direction of propagation of said signal, a waveguide arrangement for causing a shift in phase of a portion of the signal received at each horn and for introducing the phase shifted signal portion into the received signal of the other horn, including a first section of waveguide extending from said first horn in a direction perpendicular to said common plane, a second section of waveguide extending from said second horn perpendicular to said common plane, a third section of waveguide extending between said first and second sections intermediate of the ends thereof, said third section of waveguide being of length greater than twice its longest cross-sectional dimension, each of said first and second waveguide sections having a width at least equal to one-half of said longest cross-sectional dimension of said third section of waveguide, whereby the signals from said parallel sections will be caused to travel through said third section of waveguide, means for introducing power into the system, means for converting the resulting signals to intermediate frequencies, means for modulating each of said converted signals, means for amplifying said modulated signals, means for detecting said amplified signals, and means for comparing the amplitudes of said detected signals.

References Cited in the file of this patent

UNITED STATES PATENTS

| | | |
|---|---|---|
| 2,408,425 | Jenks | Oct. 1, 1946 |
| 2,433,991 | Hebb | Jan. 6, 1948 |
| 2,523,398 | Southworth | Sept. 26, 1950 |
| 2,524,180 | Schuck | Oct. 3, 1950 |
| 2,552,489 | Lawson | May 8, 1951 |
| 2,567,197 | Fox | Sept. 11, 1951 |
| 2,591,980 | Hofweegen et al. | Apr. 8, 1952 |
| 2,666,192 | Hunt et al. | Jan. 12, 1954 |
| 2,736,019 | Vogeley et al. | Feb. 21, 1956 |